US012303449B2

(12) United States Patent
Cai

(10) Patent No.: US 12,303,449 B2
(45) Date of Patent: May 20, 2025

(54) MASSAGER WITH MASSAGE BALL

(71) Applicant: Shenzhen Envision Technology Innovation Co., Ltd., Shenzhen (CN)

(72) Inventor: Xuefei Cai, Shenzhen (CN)

( * ) Notice: Subject to any disclaimer, the term of this patent is extended or adjusted under 35 U.S.C. 154(b) by 0 days.

(21) Appl. No.: 18/788,473

(22) Filed: Jul. 30, 2024

(65) Prior Publication Data

US 2025/0041151 A1 Feb. 6, 2025

(51) Int. Cl.

| | |
|---|---|
| ***A61H 19/00*** | (2006.01) |
| ***A61H 15/00*** | (2006.01) |
| ***A61H 23/02*** | (2006.01) |

(52) U.S. Cl.

CPC ......... *A61H 15/0085* (2013.01); *A61H 19/30* (2013.01); *A61H 23/0254* (2013.01); *A61H 2015/005* (2013.01); *A61H 2201/0153* (2013.01); *A61H 2201/0192* (2013.01); *A61H 2201/1207* (2013.01); *A61H 2201/14* (2013.01); *A61H 2201/1669* (2013.01); *A61H 2201/169* (2013.01)

(58) Field of Classification Search

CPC ................ A61H 21/00; A61H 23/0263; A61H 2023/0272–029

See application file for complete search history.

(56) References Cited

U.S. PATENT DOCUMENTS

| | | | | |
|---|---|---|---|---|
| 11,389,374 | B1 * | 7/2022 | He | A61H 23/006 |
| 11,633,327 | B1 * | 4/2023 | Wu | A61H 23/0263 601/70 |
| 2020/0289364 | A1 * | 9/2020 | Zhou | A61H 23/0263 |
| 2022/0096319 | A1 * | 3/2022 | Yi | A61H 23/0263 |
| 2023/0072946 | A1 * | 3/2023 | Huang | A61H 23/02 |

FOREIGN PATENT DOCUMENTS

| | | | | |
|---|---|---|---|---|
| CN | 116196210 | A | * | 6/2023 |
| KR | 20210041339 | A | * | 4/2021 |
| KR | 20220096692 | A | * | 7/2022 |

* cited by examiner

*Primary Examiner* — Thaddeus B Cox

(74) *Attorney, Agent, or Firm* — Daniel M. Cohn; Howard M. Cohn

(57) ABSTRACT

The present disclosure provides a massager with massage ball, comprising: a massager body comprises a rod-shaped body assembly and a protrusion assembly extending from one end of the rod-shaped body assembly, and a certain angle is set between the two; at least one massage ball assembly is movably passed through the protrusion assembly; the massage ball assembly comprises an eccentric driving mechanism, a transmission rod connected to the eccentric driving mechanism and a massage ball body sealingly provided on the protrusion assembly and connected to the transmission rod; the massage ball body is elastic, the eccentric driving mechanism comprises a driving motor, an eccentric block provided on the rotating shaft of the driving motor, an eccentric rod with both ends respectively fixedly connected to the eccentric block and the transmission rod.

16 Claims, 5 Drawing Sheets

MASSAGER WITH MASSAGE BALL

TECHNICAL FIELD

The present disclosure relates to a technical field of sex products, and in particular to a massager with massage ball.

BACKGROUND

With the development of economy and the progress of society, females are under great pressure at work due to the heavy, busy and fast pace of work, so relieving the pressure of daily work has become inevitable and a social consensus. Various electrical appliances are increasingly developing towards the direction of relieving work pressure, being easy to use, safe and efficient, and having multiple functions. Massagers, as an important part of people's daily electrical appliances, are no exception.

At present, there are many kinds of massagers on the market with various functions. Most common massagers achieve massage by beating, vibrating, etc. Its main structure comprises a shell, a control panel, a beating mechanism, a vibration mechanism, etc. The control panel, the beating mechanism and the vibration mechanism are all provided on the outer shell. The beating mechanism and the vibration mechanism are controlled by the control panel, so as to realize massage in the form of beating, vibration and the like. However, in the prior art, these massagers do not have a swingable massage ball, and cannot meet the user's massage requirements for relieving fatigue, relaxing the mood, and stimulating nerves in a certain area of the body. Therefore, it is necessary to improve current massager.

SUMMARY

The present disclosure provides a massager with massage ball, which provides telescopic, rotating and vibrating functions, so as to solve the problem that the existing massagers cannot meet the user's massage requirements for comprehensively relieving fatigue, relaxing the mood and stimulating nerves in a certain area of the body.

In order to realize the above purpose, the present disclosure provides a massager with massage ball, comprising: a massager body comprises a rod-shaped body assembly and a protrusion assembly extending from one end of the rod-shaped body assembly, and a certain angle is set between the two; at least one massage ball assembly is movably passed through the protrusion assembly; the massage ball assembly comprises an eccentric driving mechanism, a transmission rod connected to the eccentric driving mechanism and a massage ball body sealingly provided on the protrusion assembly and connected to the transmission rod; the massage ball body is elastic; wherein the eccentric driving mechanism comprises a driving motor, an eccentric block provided on the rotating shaft of the driving motor, the driving motor drives the eccentric block to rotate; an eccentric rod with both ends respectively fixedly connected to the eccentric block and the transmission rod; the driving motor drives the massage ball body in reciprocating motion through the eccentric block, the eccentric rod and the transmission rod in sequence.

In one embodiment, the transmission rod comprises a transmission rod body, which is a streamlined rod body; a connecting head and a connecting protrusion respectively provided at both ends of the transmission rod body, the connecting head is fixedly connected to the eccentric rod, and the connecting protrusion is detachably connected to the massage ball body.

In one embodiment, the massage ball body comprises an integrally formed connecting part and ball part; the connecting part is sealingly connected to the protrusion assembly and connected to the connecting protrusion, the eccentric driving mechanism drives the ball part in reciprocating motion through the transmission rod.

In one embodiment, the material of the massage ball body is silica gel.

In one embodiment, the rod-shaped body assembly is also fixedly provided with a circuit board and a battery assembly, the circuit board is electrically connected to the driving motor, the telescopic assembly, the vibration motor and the battery assembly respectively; the battery assembly provides electrical energy for the circuit board, the driving motor, the telescopic assembly and the vibration motor respectively.

In one embodiment, the rod-shaped body assembly comprises a rod-shaped outer shell; a first inner shell and a second inner shell respectively provided in the rod-shaped outer shell, and the two are not connected; both ends of the telescopic assembly are connected to the first inner shell and the second inner shell respectively, the telescopic assembly drives the second inner shell in a telescopic movement in the rod-shaped outer shell, the vibration motor is provided in the second inner shell.

In one embodiment, the rod-shaped outer shell is provided with a plurality of protruding strips, and the plurality of protruding strips are integrally formed with the rod-shaped outer shell.

In one embodiment, the protrusion assembly comprises an outer protrusion, the outer protrusion is integrally formed with the rod-shaped outer shell; an inner protrusion fixedly provided on the first inner shell and wrapped by the outer protrusion, the inner protrusion is a hollow cavity; at least one of the massage ball assembly is movably passed through the inner protrusion.

In one embodiment, the first inner shell and the inner protrusion are integrally formed.

In one embodiment, the material used for the rod-shaped outer shell and the outer protrusion is silica gel.

In one embodiment, the telescopic assembly comprises a telescopic motor, a portion of the telescopic motor is fixedly provided in the first inner shell; a telescopic head fixedly connected to the second inner shell and transmission-connected to the telescopic motor, the telescopic motor drives the second inner shell in a telescopic movement in the rod-shaped outer shell through the telescopic head.

In one embodiment, the shell assembly comprises a first shell and a second shell that are fixedly connected.

In one embodiment, the battery assembly adopts a polymer lithium-ion battery.

In one embodiment, the rod-shaped body assembly is fixedly provided with a charging interface, the charging interface is electrically connected to the circuit board and passes through the rod-shaped body assembly, the charging interface performs charging operations for the battery assembly.

In one embodiment, the first shell and the second shell are provided with limiting notches at corresponding positions, the two corresponding limiting notches form a limiting hole, a guide seat is movably provided in the corresponding limiting hole.

In one embodiment, it also comprises a circuit board and a battery assembly respectively fixedly provided in the shell assembly; a button assembly and an indicator light assembly respectively provided on the circuit board and passed through the shell assembly; a charging interface that passes through and is fixedly provided on the shell assembly; the circuit board is electrically connected to the telescopic rotating motor, the telescopic frame assembly, the cup body assembly, the battery assembly, the button assembly, the charging interface, and the indicator light assembly respectively.

In one embodiment, the battery assembly adopts a polymer lithium-ion battery; the charging interface performs a charging operation on the battery assembly.

In one embodiment, the rod-shaped body assembly is fixedly provided with a charging interface, the charging interface is electrically connected to the circuit board and passes through the rod-shaped body assembly, the charging interface performs charging operations for the battery assembly.

In one embodiment, the charging interface adopts one or more of a Micro USB interface, a USB Type C interface, a Lightning interface and a DC charging interface.

The massager with massage ball, comprising: a massager body comprises a rod-shaped body assembly and a protrusion assembly extending from one end of the rod-shaped body assembly, and a certain angle is set between the two; at least one massage ball assembly is movably passed through the protrusion assembly; the massage ball assembly comprises an eccentric driving mechanism, a transmission rod connected to the eccentric driving mechanism and a massage ball body sealingly provided on the protrusion assembly and connected to the transmission rod; the massage ball body is elastic.

After adopting the above technical solutions, the massager with massage ball provided by the present disclosure has beneficial effects as follows:

In the embodiment of the present invention, the driving motor drives the ball part on the massage ball body in reciprocating motion through the eccentric block, eccentric rod and transmission rod in sequence, so that the ball part performs reciprocating massage operation on the corresponding area of the human body, and the curvature and height of the ball part just meet the requirements of the sensitive nerves of the human body, thereby achieving the purpose of stimulating the sensitive nerves of the human body; at the same time, the telescopic assembly and the vibration motor cooperate with each other to achieve the telescopic and vibration functions of the massager.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
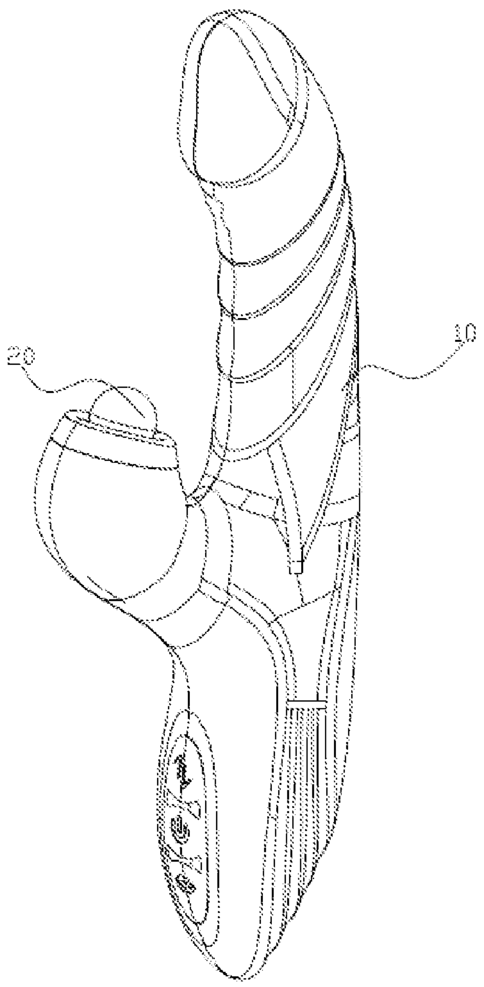
FIG. 1 is a schematic structural diagram of a massager with massage ball provided by the present disclosure.
Figure 2:
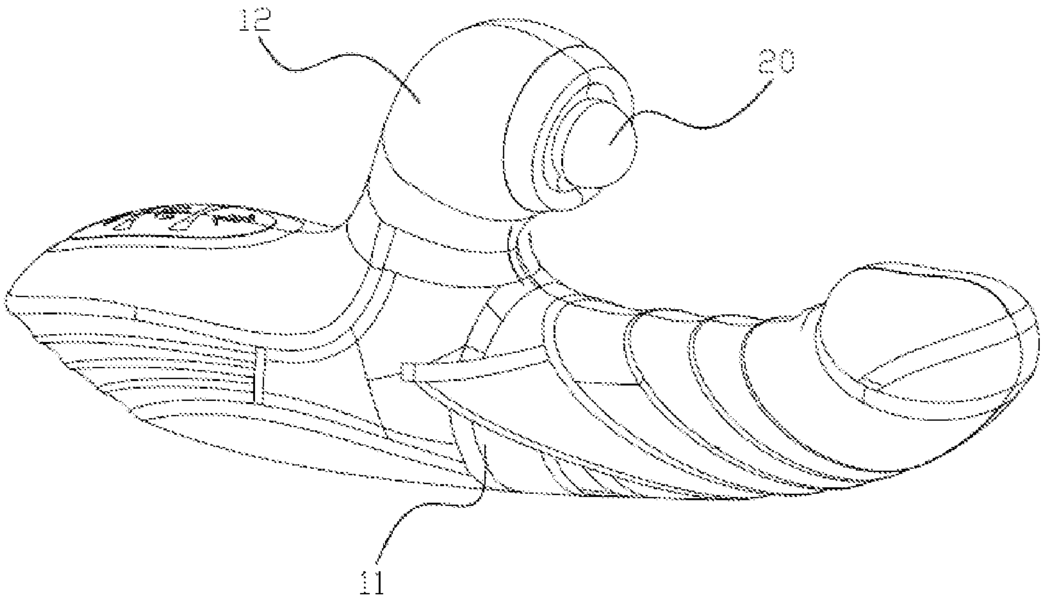
FIG. 2 is another schematic structural diagram of the structure of a massager with massage ball of the present disclosure shown in FIG. 1.

Reference number in the drawings:

| | | | |
|---|---|---|---|
| massager body | 10 | rod-shaped body assembly | 11 |
| rod-shaped outer shell | 111 | through hole | 1111 |
| protruding stripes | 1112 | first inner shell | 112 |
| cover plate | 1211 | second inner shell | 113 |
| protrusion assembly | 12 | outer protrusion | 121 |
| inner protrusion | 122 | circuit board | 13 |
| button | 131 | telescopic assembly | 14 |
| telescopic motor | 141 | telescopic head | 142 |
| vibration motor | 15 | battery assembly | 16 |
| charging interface | 17 | massage ball assembly | 20 |
| polarization driving mechanism | 21 | driving motor | 211 |
| polarization block | 212 | eccentric rod | 213 |
| transmission rod | 22 | transmission rod body | 221 |
| connecting head | 222 | connecting protrusion | 223 |
| massage ball body | 23 | connecting part | 231 |
| ball part | 232 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 5, the present disclosure provides a massager with massage ball, mainly comprising a massager body 10 and at least one massage ball assembly 20. The at least one massage ball assembly 20 is movably provided on the massager body 10 and can telescopically move relative to the massager body 10, thereby performing reciprocating massage operations on corresponding area of the human body. In this embodiment, one massage ball assembly 20 is movably provided on the massager body 10; in other embodiments, the number of the massage ball assembly 20 can be two, three or other plurality, and the number is set according to actual needs.

Referring to FIG. 1 to FIG. 4, in the embodiment, the massager body 10 comprises a rod-shaped body assembly 11, a protrusion assembly 12, a circuit board 13, a telescopic assembly 14, a vibration motor 15, a battery assembly 16 and a charging interface 17; the rod-shaped body assembly 11 is a hollow cavity; the protrusion assembly 12 extends from one end of the rod-shaped body assembly 11 and is provided at a certain angle with the rod-shaped body assembly 11. At least one massage ball assembly 20 is movably provided in the protrusion assembly 12; the circuit board 13 and the battery assembly 16 are respectively fixedly provided in the rod-shaped body assembly 11, the circuit board 13 is electrically connected to the telescopic assembly 14, the vibration motor 15, the battery assembly 16, the charging interface 17 and the massage ball assembly 20 respectively; the battery assembly 16 provides power to the circuit board 13, the telescopic assembly 14, the vibration motor 15, and the massage ball assembly 20; the telescopic assembly 14 and the vibration motor 15 are respectively provided in the rod-shaped body assembly, the telescopic assembly 14 can drive the rod-shaped body assembly 11 in a telescopic movement, and the vibration motor 15 drives the rod-shaped body assembly 11 to vibrate, thereby achieving a vibration massage effect; the charging interface 17 is passed through the rod-shaped body assembly 11, and the battery assembly 16 is charged through the charging interface 17.

Referring to FIG. 1 to FIG. 4, in the embodiment, the rod-shaped body assembly 11 comprises a rod-shaped outer shell 111, a first inner shell 112 and a second inner shell 113; the first inner shell 112 and the second inner shell 113 are respectively provided in the rod-shaped outer shell 111 and the two are not connected; the rod-shaped outer shell 111 tightly wraps the first inner shell 112 and the second inner shell 113; one end of the telescopic assembly 14 is connected to the first inner shell 112, the other end of the telescopic assembly 14 is connected to the second inner shell 113, and the telescopic assembly 14 drives the second inner shell 113 in a telescopic movement in the rod-shaped outer shell 111, and the vibration motor 15 is provided in the second inner shell 113. Specifically, a through hole 1111 is passed through the hand-grip portion of the rod-shaped outer shell 111; the rod-shaped outer shell 111 is also provided with a plurality of integrally formed protruding strips 1112, the friction force of the rod-shaped body assembly 11 is increased by a plurality of protruding strips 1112, thereby improving the massage effect; a cover plate 1211 is provided at a position of the first inner shell 112 corresponding to the through hole 1111, and a plurality of buttons 131 provided on the circuit board 13 is respectively passed through the cover plate 1211, and the massager can be switched on and off and corresponding function settings can be performed through the plurality of buttons 131.

Referring to FIG. 1 to FIG. 4, in the embodiment, the protrusion assembly 12 comprises an outer protrusion 121 and an inner protrusion 122; the outer protrusion 121 is integrally formed with the rod-shaped outer shell 111, and the material of the two is silica gel; the inner protrusion 122 is a hollow cavity, the inner protrusion 122 is fixedly provided on the first inner shell 112 and is wrapped by the outer protrusion 121, at least one massage ball assembly 20 is movably passed through the inner protrusion 122; specifically, the first inner shell 112 and the inner protrusion 122 are integrally formed.

Figure 3:
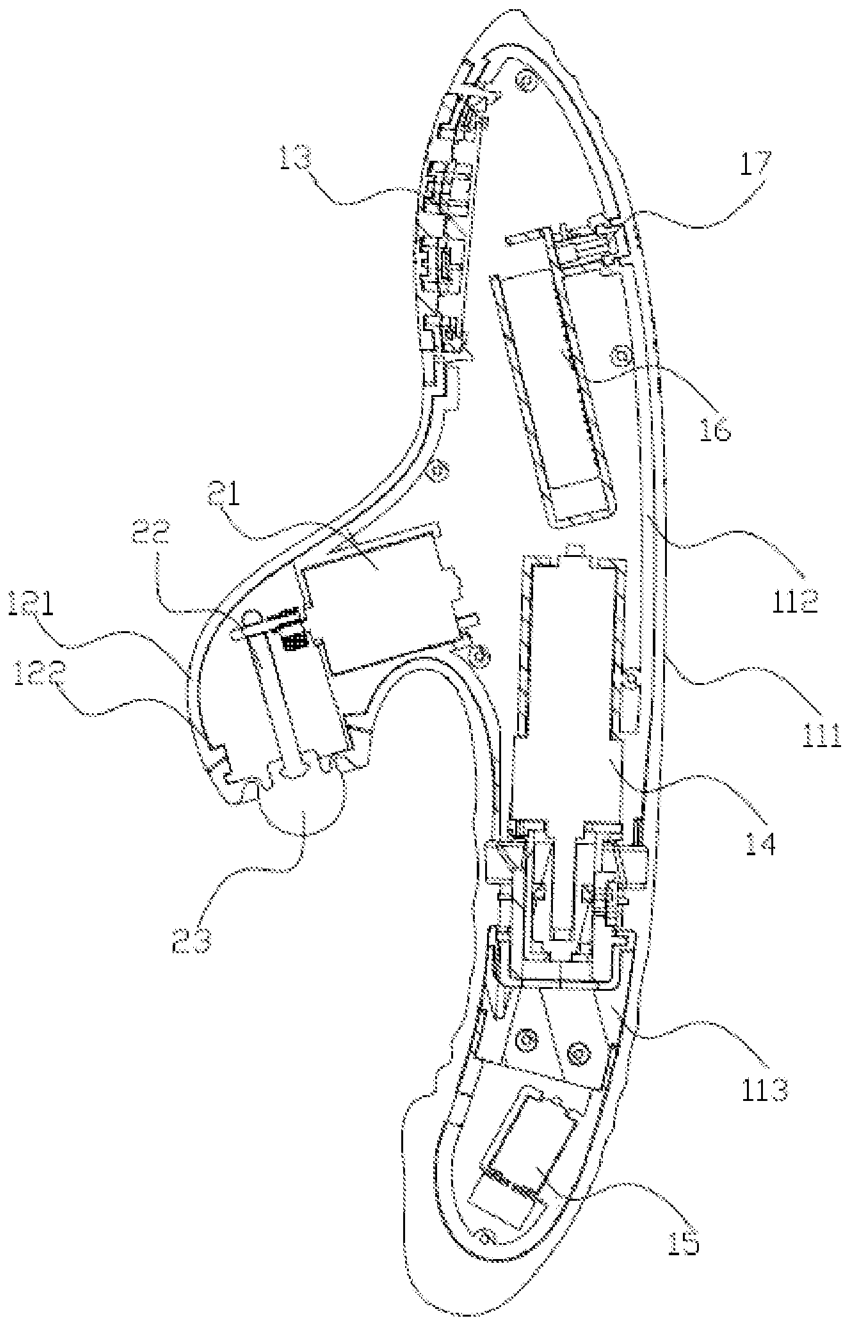
FIG. 3 is a schematic cross-sectional view of a massager with massage ball of the present disclosure shown in FIG. 1.
Figure 4:
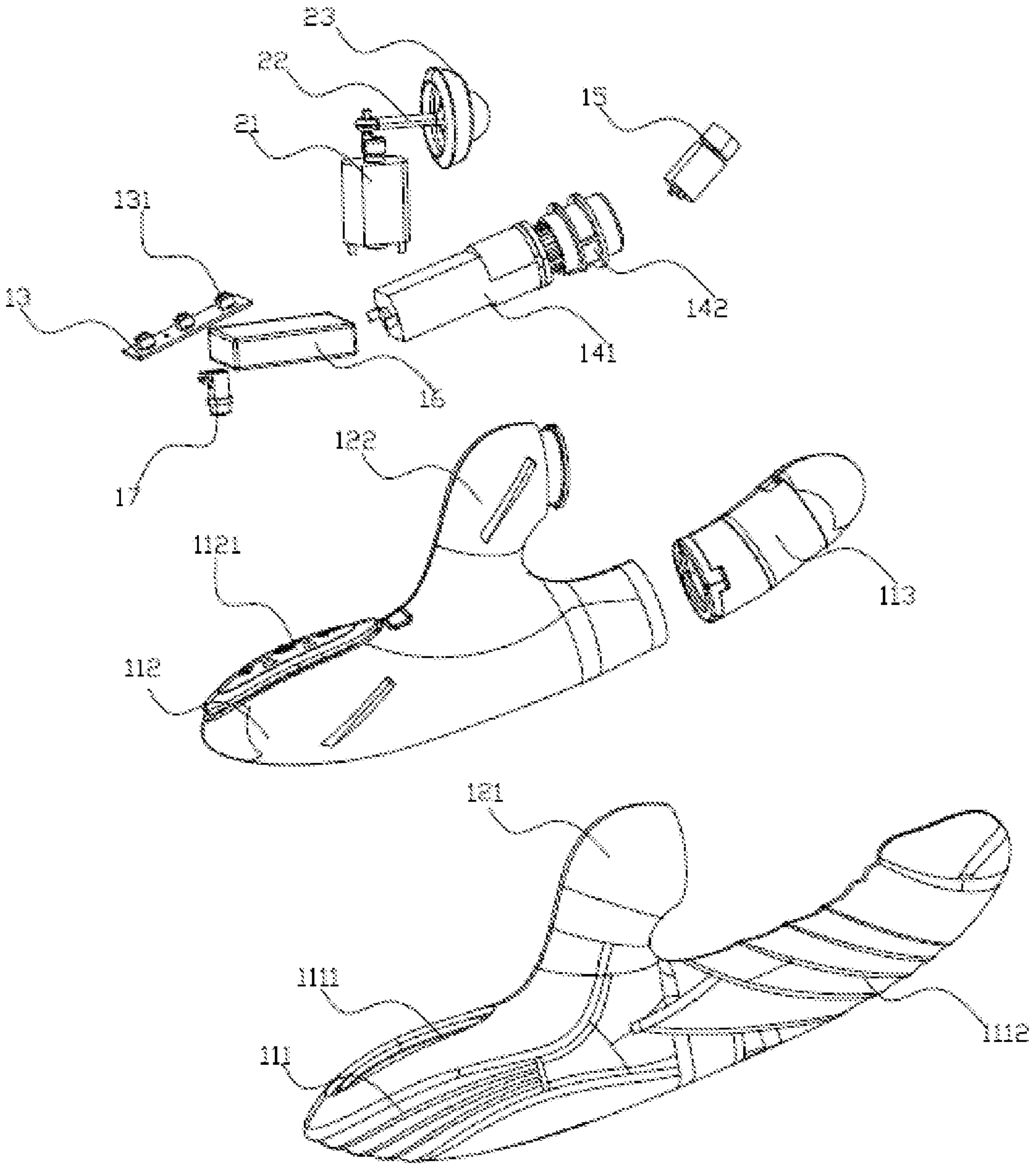
FIG. 4 is a schematic diagram of the exploded structure of a massager with massage ball of the present disclosure shown in FIG. 1, comprising a massage ball assembly.

Referring to FIG. 3 and FIG. 4, in the embodiment, the telescopic assembly 14 comprises a telescopic motor 141 and a telescopic head 142; a part of the telescopic motor 141 is fixedly provided in the first inner shell 112; the telescopic head 142 is fixedly connected to the second inner shell 113 and is in transmission connection with the telescopic motor 141, the telescopic motor 141 drives the second inner shell 113 to perform telescopic motion in the rod-shaped outer shell 111 through the telescopic head 142. Specifically, the battery assembly 16 adopts a polymer lithium-ion battery, the charging interface 17 can be one or more of a Micro USB interface, a USB Type C interface, a Lightning interface and a DC charging interface. In this embodiment, the charging interface 17 is the DC charging interface.

Referring to FIG. 1 to FIG. 5, in the embodiment, the massage ball assembly 20 comprises an eccentric driving mechanism 21, a transmission rod 22 and a massage ball body 23; the eccentric driving mechanism 21 is provided in the protrusion assembly 12; the transmission rod 22 is in transmission connection with the eccentric driving mechanism 21, the eccentric driving mechanism 21 drives the transmission rod 22 in reciprocating motion; the massage ball body 23 is elastic and is sealingly provided on the protrusion assembly 12 and connected to the transmission rod 22, the eccentric driving mechanism 21 drives the massage ball body 23 in reciprocating motion through the transmission rod 22.

Figure 5:
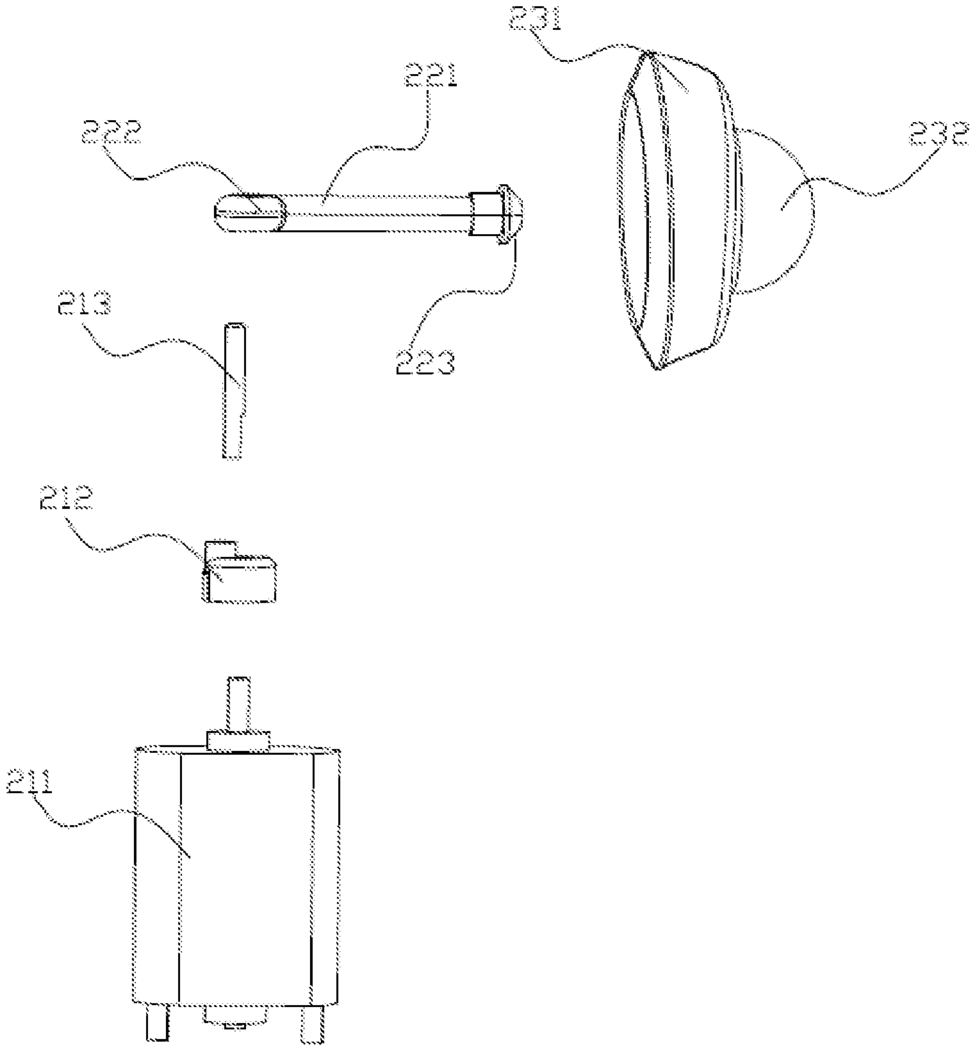
FIG. 5 is an exploded structural schematic diagram of the massage ball assembly shown in FIG. 4.

Referring to FIG. 3 to FIG. 5, in the embodiment, the eccentric driving mechanism 21 comprises a driving motor 211, an eccentric block 212 and an eccentric rod 213; the driving motor 211 is provided in the inner protrusion 122; the eccentric block 212 is disposed on the rotating shaft of the driving motor 211, the driving motor 211 drives the eccentric block 212 to rotate; one end of the eccentric rod 213 is fixedly connected to the eccentric block 212, the other end of the eccentric rod 213 is fixedly connected to the transmission rod 22, the driving motor 211 drives the transmission rod 22 in reciprocating motion through the eccentric block 212 and the eccentric rod 213 in sequence.

Referring to FIG. 3 to FIG. 5, in the embodiment, the transmission rod 22 comprises a transmission rod body 221, a connecting head 222 and a connecting protrusion 223; the transmission rod body 221 is a streamlined rod body; the connecting head 222 and the connecting protrusion 223 are respectively provided at both ends of the transmission rod body 221, the connecting head 222 is fixedly connected to the eccentric rod 213, the connecting protrusion 223 is detachably connected to the massage ball body 23, the massage ball body 23 tightly wraps the connecting protrusion 223.

Referring to FIG. 3 to FIG. 5, in the embodiment, the massage ball body 23 is elastic and the material of the massage ball body 23 is silica gel; the massage ball body 23 comprises an integrally formed connecting part 231 and ball part 232; the connecting part 231 is sealingly connected to the protrusion assembly 12 and is connected to the connecting protrusion 223, the eccentric driving mechanism 21 drives the ball part 232 in a reciprocating motion through the transmission rod 22, thereby realizing a reciprocating massage operation on the corresponding area of the human body.

It should be noted that the specific working process of the massager with a massage ball of the present invention is as follows: the speed of the driving motor 211 is controlled differently by pressing the corresponding button 131, the driving motor 211 drives the ball part 232 on the massage ball body 23 in reciprocating motion through the eccentric block 212, the eccentric rod 213 and the transmission rod 22 in sequence, so that the ball part 232 performs a reciprocating massage operation on the corresponding area of the human body, and the curvature and height of the ball part 232 just meet the requirements of the sensitive nerves of the human body, thereby achieving the purpose of stimulating the sensitive nerves of the human body; at the same time, the telescopic assembly 14 and the vibration motor 15 cooperate with each other to achieve the telescopic and vibration functions of the massager.

The technical features of the above-described embodiments may be arbitrarily combined. To make the description concise, not all possible combinations of the technical features in the embodiments are described. However, as long as there is no contradiction in the combination of these technical features, they should be considered to be within the scope of this specification.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A massager with massage ball, comprising:

a massager body comprising a rod-shaped body assembly and a protrusion assembly extending from one end of the rod-shaped body assembly, and wherein a certain angle is set between the rod-shaped body assembly and the protrusion assembly; and at least one massage ball assembly that is movably passed through the protrusion assembly;

wherein the at least one massage ball assembly comprises an eccentric driving mechanism, a transmission rod connected to the eccentric driving mechanism and a massage ball body sealingly provided on the protrusion assembly and connected to the transmission rod; wherein the massage ball body is elastic;

wherein the eccentric driving mechanism comprises a driving motor, an eccentric block provided on a rotating shaft of the driving motor, and an eccentric rod, wherein the driving motor drives the eccentric block to rotate; two ends of the eccentric rod are respectively fixedly connected to the eccentric block and the transmission rod; the driving motor drives the massage ball body in reciprocating motion through the eccentric block, the eccentric rod and the transmission rod in sequence, wherein the rod-shaped body assembly is provided with a telescopic assembly and a vibration motor; the telescopic assembly drives the rod-shaped body assembly in a telescopic movement; the vibration motor drives the rod-shaped body assembly to vibrate.

2. The massager with massage ball of claim 1, wherein the transmission rod comprises a transmission rod body, a connecting head, and a connecting protrusion, wherein the transmission rod body is a streamlined rod body; the connecting head and the connecting protrusion are respectively provided at both ends of the transmission rod body, wherein the connecting head is fixedly connected to the eccentric rod, and the connecting protrusion is detachably connected to the massage ball body.

3. The massager with massage ball of claim 2, wherein the massage ball body comprises an integrally formed connecting part and ball part; the connecting part is sealingly connected to the protrusion assembly and connected to the connecting protrusion, the eccentric driving mechanism drives the ball part in reciprocating motion through the transmission rod.

4. The massager with massage ball of claim 1, wherein a material of the massage ball body is silica gel.

5. The massager with massage ball of claim 1, wherein the rod-shaped body assembly is also fixedly provided with a circuit board and a battery assembly, the circuit board is electrically connected to the driving motor, the telescopic assembly, the vibration motor and the battery assembly respectively; the battery assembly provides electrical energy for the circuit board, the driving motor, the telescopic assembly and the vibration motor respectively.

6. The massager with massage ball of claim 5, wherein the battery assembly comprises a polymer lithium-ion battery.

7. The massager with massage ball of claim 5, wherein the rod-shaped body assembly is fixedly provided with a charging interface, the charging interface is electrically connected to the circuit board and passes through the rod-shaped body assembly, the charging interface performs charging operations for the battery assembly.

8. The massager with massage ball of claim 7, wherein the charging interface comprises one or more of a Micro USB interface, a USB Type C interface, a Lightning interface and a DC charging interface.

9. The massager with massage ball of claim 1, wherein the rod-shaped body assembly comprises a rod-shaped outer shell; wherein a first inner shell and a second inner shell are respectively provided in the rod-shaped outer shell, and the first inner shell and the second inner shell are not connected; both ends of the telescopic assembly are connected to the first inner shell and the second inner shell respectively, the telescopic assembly drives the second inner shell in a telescopic movement in the rod-shaped outer shell, the vibration motor is provided in the second inner shell.

10. The massager with massage ball of claim 9, wherein the rod-shaped outer shell is provided with a plurality of protruding strips, and the plurality of protruding strips are integrally formed with the rod-shaped outer shell.

11. The massager with massage ball of claim 9, wherein the protrusion assembly comprises an outer protrusion and an inner protrusion, the outer protrusion is integrally formed with the rod-shaped outer shell; the inner protrusion is fixedly provided on the first inner shell and is wrapped by the outer protrusion, the inner protrusion is a hollow cavity; at least one of the at least one massage ball assembly is movably passed through the inner protrusion.

12. The massager with massage ball of claim 11, wherein the first inner shell and the inner protrusion are integrally formed.

13. The massager with massage ball of claim 11, wherein a material used for the rod-shaped outer shell and the outer protrusion is silica gel.

14. The massager with massage ball of claim 9, wherein the telescopic assembly comprises a telescopic motor and a telescopic head, a portion of the telescopic motor is fixedly provided in the first inner shell; the telescopic head is fixedly connected to the second inner shell and is transmission-connected to the telescopic motor, the telescopic motor drives the second inner shell in a telescopic movement in the rod-shaped outer shell through the telescopic head.

15. A massager with massage ball, comprising:

a massager body comprising a rod-shaped body assembly and a protrusion assembly extending from one end of the rod-shaped body assembly, and a certain angle is set between the rod-shaped body assembly and the protrusion assembly; and at least one massage ball assembly that is movably passed through the protrusion assembly;

wherein the at least one massage ball assembly comprises an eccentric driving mechanism, a transmission rod connected to the eccentric driving mechanism and a massage ball body sealingly provided on the protrusion assembly and connected to the transmission rod; wherein the massage ball body is elastic;

wherein the rod-shaped body assembly is provided with a telescopic assembly and a vibration motor; the telescopic assembly drives the rod-shaped body assembly in a telescopic movement; the vibration motor drives the rod-shaped body assembly to vibrate.

16. A massager with massage ball, comprising:

a massager body comprising a rod-shaped body assembly and a protrusion assembly extending from one end of the rod-shaped body assembly, and wherein a certain angle is set between the rod-shaped body assembly and the protrusion assembly; and at least one massage ball assembly that is movably passed through the protrusion assembly; wherein the at least one massage ball assembly comprises an eccentric driving mechanism, a transmission rod connected to the eccentric driving mechanism and a massage ball body sealingly provided on the protrusion assembly and connected to the transmission rod; wherein the massage ball body is elastic;

wherein the eccentric driving mechanism comprises a driving motor, an eccentric block provided on a rotating shaft of the driving motor, and an eccentric rod, wherein the driving motor drives the eccentric block to rotate; two ends of the eccentric rod are respectively fixedly connected to the eccentric block and the transmission rod; the driving motor drives the massage ball body in reciprocating motion through the eccentric block, the eccentric rod and the transmission rod in sequence;

wherein the transmission rod comprises a transmission rod body, a connecting head, and a connecting protrusion; wherein the transmission rod body is a streamlined rod body; the connecting head and the connecting protrusion are respectively provided at both ends of the transmission rod body, wherein the connecting head is fixedly connected to the eccentric rod, and the connecting protrusion is detachably connected to the massage ball body, wherein the massage ball body comprises an integrally formed connecting part and ball part; the connecting part is sealingly connected to the protrusion assembly and connected to the connecting protrusion, the eccentric driving mechanism drives the ball part in reciprocating motion through the transmission rod.

* * * * *